United States Patent [19]
Maeda et al.

[11] Patent Number: 6,028,644
[45] Date of Patent: Feb. 22, 2000

[54] DATA BROADCAST RECEIVING APPARATUS RECEIVING A TELEVISION BROADCAST SIGNAL WITH A SUPERPOSED DATA BROADCAST SIGNAL

[75] Inventors: Takjo Maeda, Shijonawate; Hidemi Henmi, Otsu; Namio Yamaguchi; Isao Kandaka, both of Hirakata, all of Japan

[73] Assignee: Matsushita Electric Industrial Co., Ltd., Osaka, Japan

[21] Appl. No.: 09/251,287

[22] Filed: Feb. 17, 1999

Related U.S. Application Data

[62] Division of application No. 08/713,854, Sep. 13, 1996, Pat. No. 5,914,756.

[30] Foreign Application Priority Data

| Sep. 14, 1995 | [JP] | Japan | 7-236706 |
| Sep. 14, 1995 | [JP] | Japan | 7-236707 |
| Sep. 14, 1995 | [JP] | Japan | 7-236708 |
| Sep. 14, 1995 | [JP] | Japan | 7-236709 |
| Sep. 14, 1995 | [JP] | Japan | 7-236710 |

[51] Int. Cl.$^7$ ................................................. H04N 5/445
[52] U.S. Cl. ........................... 348/563; 348/6; 348/12; 348/553
[58] Field of Search ........................... 348/563, 569, 348/589, 600, 468, 6, 7, 12, 13, 10, 552, 553; 455/3.1, 4.2, 5.1; H04N 5/445, 7/173

[56] References Cited

U.S. PATENT DOCUMENTS

| 4,486,779 | 12/1984 | Marti . |
| 5,781,245 | 7/1998 | Van Der Weig . |
| 5,850,265 | 12/1998 | Suh .......................................... 348/553 |

FOREIGN PATENT DOCUMENTS

| 0 569 311 | 11/1993 | European Pat. Off. . |
| 0 583 196 | 2/1994 | European Pat. Off. . |
| 2-110660 | 4/1990 | Japan . |
| 7-288606 | 10/1995 | Japan . |

OTHER PUBLICATIONS

European Search Report dated Oct. 21, 1997, EP 96 30 6664.

*Primary Examiner*—Sherrie Hsia
*Attorney, Agent, or Firm*—Ratner & Prestia

[57] ABSTRACT

A data broadcast receiving apparatus used in a system is combined with another transmission line such as telephone circuit. By receiving a television broadcast having a data broadcast signal, such as a teletext signal, superposed on the television broadcast signal, in which a first auxiliary information signal contained in the data broadcast signal and a second auxiliary information signal from the other transmission line are extracted, a control procedure is created responsive to the first and second auxiliary information signals, and the data broadcast signal and main information from the other transmission line are processed responsive to the control procedure.

3 Claims, 12 Drawing Sheets

DATA BROADCAST RECEIVING APPARATUS RECEIVING A TELEVISION BROADCAST SIGNAL WITH A SUPERPOSED DATA BROADCAST SIGNAL

This application is a division of U.S. patent application Ser. No. 08/713,854, filed Sep. 13, 1996, U.S. Pat. No. 5,914,756.

BACKGROUND OF THE INVENTION

The present invention relates to a data broadcast receiving apparatus for receiving television broadcast having data broadcast signal such as teletext signal superposed on television broadcast signal, and more particularly to a system combined with other transmission line such as telephone circuit.

Generally, the data broadcast receiving apparatus comprises a data broadcast decoder unit for decoding the data broadcast signal superposed on television broadcast, a display unit for displaying video signal of television broadcast or data broadcast, and a modem connected to a telephone circuit.

FIG. 1 is a block diagram showing a schematic configuration of data broadcast system with interactive function.

In FIG. 1, reference numeral 1 denotes a television broadcast station, 2 is a data broadcast receiving apparatus serving also as television receiver comprising a data broadcast decoder 2a and a modem 2b, and 3 is a response server connected to the data broadcast receiving apparatus 2 through a telephone circuit 4 and also connected to the television broadcast station 1 through a telephone circuit 5.

At the television broadcast station 1, main information such as character and graphic data, and auxiliary information such as program for adding interactive property and related information are coded according to a predetermined standard, converted into data signals, combined with synchronizing code, error correction code, and others, and prepared as data broadcast signal assigned in data packet, and it is superposed in the vertical blanking period (VBL) of video signal, same as in the case of teletext, and converted into radio wave and broadcast.

In the data broadcast receiving apparatus 2, the data broadcast signal is decoded in the data broadcast decoder 2a, stored, displayed, and interpreted as required, and executed according to the specified process. In the case the content of television broadcast is television shopping or data survey, the telephone number or facsimile number of the supplier or destination is contained as television broadcast signal, and it is stored in the memory.

By the input means in the data broadcast receiving apparatus 2, the merchandise name, quantity of purchase, name of purchaser, address, and response data of survey are added and stored in the memory.

By automatic dialing, the necessary data is transmitted to the response server 3 through modem 2b and telephone circuit 4.

The response server 3 collects orders and replies from individual homes, and processes the data according to the prepared instruction from the television broadcast station 1, information provider or service firm, and the result of processing is transmitted to the television broadcast station 1, information provider or service firm. In this way, interactive (two-way) data is transmitted and received.

This system, however, involves several problems.

First, in the case of online service connection with the response server, it is required to do in a short time while the corresponding telephone number is superposed on the data broadcast signal by television broadcast. It was hence impossible to connect to the online service at an arbitrary time desired by the user.

Second, in the event of online service with the response server, the telephone number of online service is accompanied by valid term. For example, in online shopping, the order closing time may be determined for every sales company or every merchandise. In such a case, adequate control of online service telephone number with valid term seems useful technique.

Third, recently, the number of channels tends to increase, especially in satellite broadcasting, from dozens to more than a hundred. At the same time, various services may be provided from the response servers. In such increasing trend in the number of channels and variety of services, it is very hard for the user of the television receiver to search desired program or information by own operation. Or, it may fail to search by specific time or in a specific duration. It is more and more difficult as the number of channels increases or the number of programs increases to view the desired television broadcast program or data broadcast program at due timing according to the user's own request, such as a drama or news program played or hosted by a specific personality, sports program or news of a specific team, television shopping, special event program, and specific local weather forecast. A similar difficulty may be considered to obtain user's desired stock or other information from the response server through modem and telephone circuit.

Fourth, in the case of television shopping or online survey while washing the television, the lines are occupied and busy right after start of acceptance, and one must wait for a long time until the line is connected. In such a case, it seems useful technique to determine the sequence of line connection timing by some way or other.

Fifth, when data broadcast signal is superposed on television broadcast, various information can be transmitted inexpensively over a very wide area (coverage). Wide coverage means freedom from regional prejudice in the content of information. In other words, it is a demerit for distributing individual information in each district. One of the causes is that the coverage area of broadcast wave is generally different from the area of each district. The coverage area is far wider. When transmitting individual information in each district all by television broadcast, the quantity of information is enormous, and it takes a very long time. A user in a specific district, wishing to obtain the original information in the district, must wait for a long time until the information is distributed. If the information is obtained after long waiting, it is not guaranteed that the information is exactly as desired. In particular, the problem is serious in the event of emergency information. For example, if urgent evacuation of residents is requested in the event of earthquake or major disaster, if the escape destination and escape route in the district are sequentially distributed for all districts, it takes a very long time, and it is useless for emergency cases.

It is also requested that the individual information be obtained easily in each district. Not limited to regionality, concerning information about individual hobby or concern, same problems are present for obtaining the desired information easily.

SUMMARY OF THE INVENTION

It is hence an object of the invention to process the data broadcast signal, and two pieces of main information from other transmission line efficiently according to the purpose, in a data broadcast receiving apparatus used in a system combined with other transmission line such as telephone circuit, for receiving television broadcast having data broadcast signal such as teletext signal superposed on television broadcast signal.

To achieve the object, the invention comprises data broadcast decoding means for decoding data broadcast signal superposed on television broadcast into first main information and auxiliary information, display means for displaying video signal of its television broadcast or data broadcast, interface means for input and output of second main information and auxiliary information from an external device connected to a telephone circuit, and control means for receiving first auxiliary information signal contained in the data broadcast signal from the data broadcast decoding means and second auxiliary information signal from the interface means, creating control procedure on the basis of the first and second auxiliary information signals, and processing the data from the data broadcast decoding means and interface means.

Accordingly, the first and second main information can be processed efficiently by combining the first auxiliary information such as program superposed on television broadcast signal with second auxiliary information from server or other transmission line such as telephone circuit.

Concerning effective utilization of telephone number information as first auxiliary information contained in the data transmission signal, the data broadcast receiving apparatus comprises a data broadcast decoder unit for decoding data broadcast signal superposed on television broadcast, a display unit for displaying video signal of television broadcast or data broadcast, a modem connected to a telephone circuit, and a control unit for registering preliminarily the telephone number information of online service from the data broadcast decoder unit, and dialing the telephone number automatically through the modem to connect online service with the response server when the user specifies the telephone number in response to the online service information through the modem, whereby information can be obtained efficiently from other transmission line by using the telephone number.

More specifically, by using an arbitrary empty channel for storing the telephone number, when the user specifies the empty channel corresponding to the online service, the telephone number is dialed automatically through the modem to connect the online service with the response server, and therefore the online service may be easily used at a desired time only by specifying the empty channel corresponding to the online service by the user, so that the controllability may be enhanced.

Concerning effective utilization of valid term information as first auxiliary information contained in data broadcast signal, the data broadcast receiving apparatus comprises a data broadcast decoder unit for decoding data broadcast signal superposed on television broadcast, a display unit for displaying video signal of television broadcast or data broadcast, and a modem connected to a telephone circuit, wherein the data decoded in the data broadcast decoder unit is judged to contain valid term information or not, and, if contained, the data is added to the process waiting list, and if expired, the data is deleted from the process waiting list, whereby the process waiting list may be composed so as to register sequentially from the earlier closing time of the valid term. As for the data remaining on the process waiting list, the user can utilize the online service whenever desired. Moreover, since invalid data expiring the valid term is deleted, useless online service connection is avoided. As for such validity of data, the validity of data equivalent to the above valid term can be evaluated by evaluating the oldness of the data from the number of times of display or number of times of reproduction of the data, or evaluating the oldness of the data from the difference between the merchandise list price and the current price.

Concerning effective utilization of control signal as second auxiliary information signal from other transmission line such as telephone circuit, the data broadcast receiving apparatus comprises a data broadcast decoder unit for decoding data broadcast signal superposed on television broadcast, a display unit for displaying video signal of television broadcast or data broadcast, a modem connected to a telephone circuit, wherein the screen display state of the display unit is controlled on the basis of the control signal transmitted from outside through the telephone circuit, whereby it offers service in a completely new form of controlling the display state of the display unit screen by control from outside through the telephone circuit.

That is, in the response server connected through the telephone circuit, the user of the data broadcast receiving apparatus preliminarily registers a desired program, and the receiving channel is automatically changed over to the broadcast channel of the desired program according to the control signal transmitted through the telephone circuit from the response server just before the registered program is broadcast.

Moreover, in multi-channel television broadcast signals, if the quantity of superposed data increases, by registering the user's desired information type preliminarily in the response server, the response server sends out a control signal to the data broadcast receiving apparatus at the user side at a specific timing, and the data broadcast receiving apparatus automatically set in the corresponding channel according to the control signal, so that the user can view the desired program at due timing and obtain necessary information.

Concerning effective utilization of delay control information as first auxiliary information signal contained in the data broadcast signal, the data broadcast receiving apparatus comprises a data broadcast decoder unit for decoding data broadcast signal superposed on television broadcast, a display unit for displaying video signal of television broadcast or data broadcast, a modem connected to a telephone circuit, wherein it is designed to wait for actual connection by delay time determined according to delay control information when connection to online service is requested, and execute online connection after the delay time, whereby the connection request timing is dispersed among multiple data broadcast receiving apparatuses, and disorderly connection attempts or busy lines may be avoided, so that connection attempts of individual data broadcast receiving apparatuses may be done smoothly on the whole.

Concerning effective utilization of ID number information as first auxiliary information signal contained in data broadcast signal, the data broadcast receiving apparatus comprises a data broadcast decoder unit for decoding data broadcast signal superposed on television broadcast, a display unit for displaying video signal of television broadcast or data broadcast, a modem connected to a telephone circuit, wherein ID number showing specific information (for example, regional information, age, sex or other individual information, brand preference information and others) and telephone number of corresponding response server are extracted from the data broadcast decoder unit, this ID number is specified, the data broadcast signal of the ID number coinciding with this individual ID number is stored, this telephone number is automatically dialed through the modem to connect with the response server, and the specific detailed information is obtained from the response server through the modem, whereby the user can obtain the desired specific information easily.

In other specific example, as the data broadcast signal, individual information in each district is superposed together with the ID number designating the district and telephone number of the response server in that district, the data transmission signal of the ID number coinciding with the ID number of the data broadcast receiving apparatus is stored, the telephone number is dialed automatically through the modem to connect with the response server, and the individual information of the district is obtained from the response server through the telephone circuit, so that the individual information can be obtained automatically by automatically connecting to the response server of the district.

BRIEF DESCRIPTION OF THE DRAWINGS

FIG. 7 (*b*) is a schematic diagram after adding process;

FIG. 8 (*b*) is a schematic diagram after deleting process;

Figure 1:
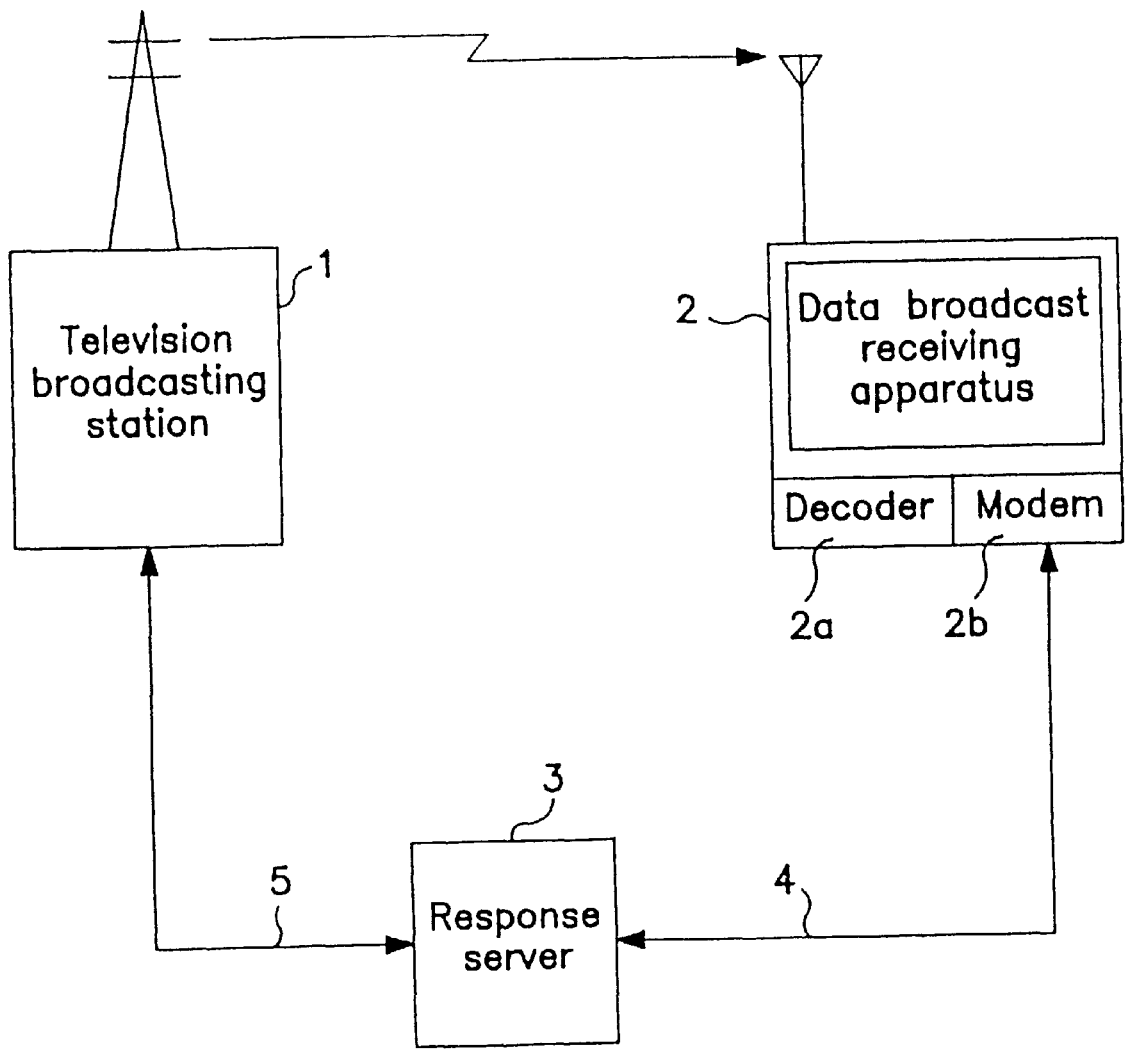
FIG. 1 is a schematic block diagram of a data broadcast receiving apparatus of prior art.

The entire disclosure of U.S. patent application Ser. No. 08/713,854, filed Sep. 13, 1996, U.S. Pat. No. 5,914,756 is expressly incorporated by reference herein.

DESCRIPTION OF THE PREFERRED EMBODIMENTS

Referring now to the drawings, embodiments of the data broadcast receiving apparatus of the invention are described in detail below.

Embodiment 1

Figure 2:
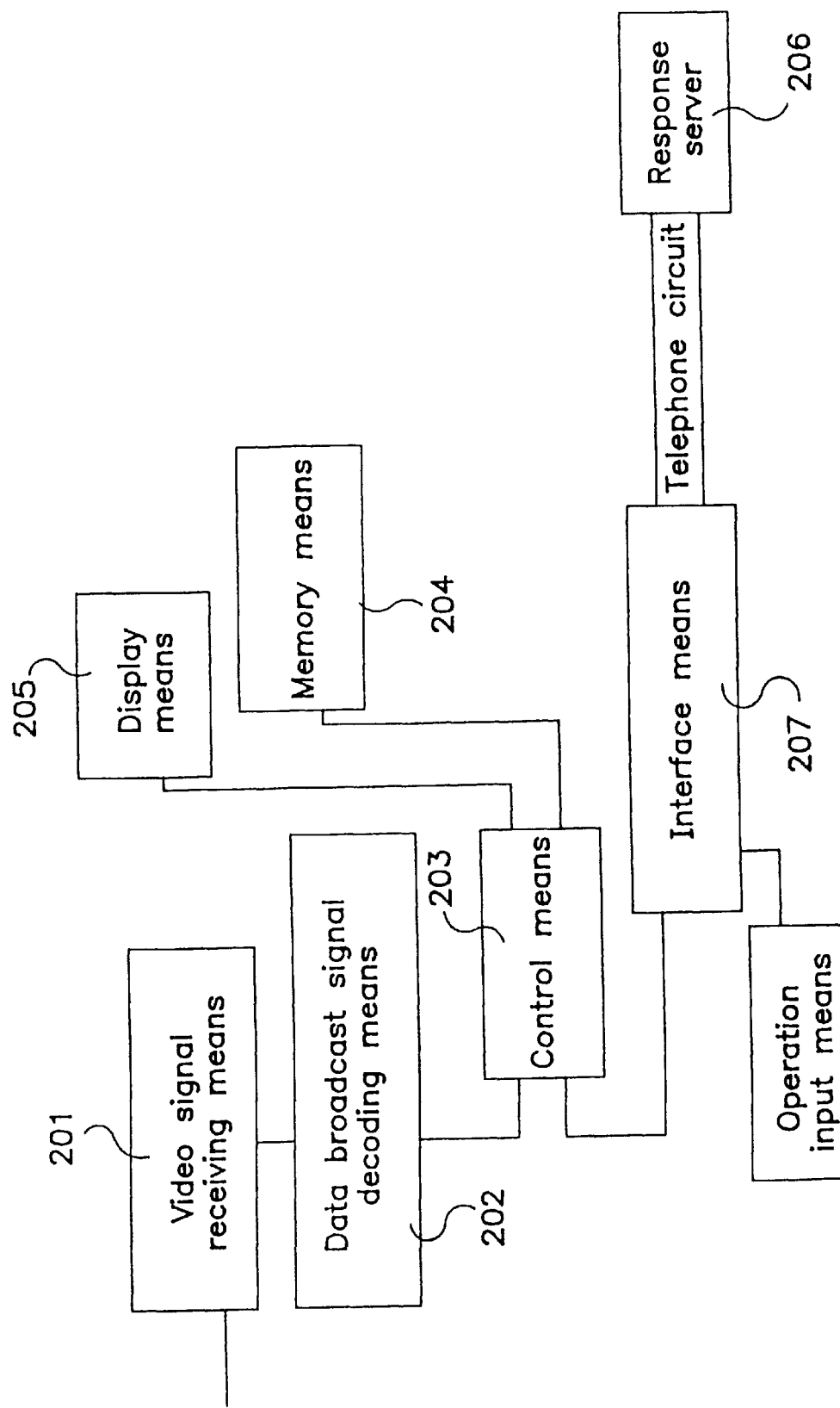
FIG. 2 is a block diagram of a data broadcast receiving apparatus according to a first embodiment of the invention.

FIG. 2 is a block diagram showing a constitution of a data broadcast receiving apparatus of a first embodiment of the invention.

In FIG. 2, television broadcast superposing data broadcast signal such as teletext signal in the vertical blanking period of television broadcast signal is received by video signal receiving means 201, and is processed by so-called demodulation, and in data broadcast signal decoding means 202, in particular, the data broadcast signal superposed on television broadcast is processed and decoded into main information such as teletext and auxiliary signal such as related information and control program, and the demodulated television broadcast signal and decoded data broadcast signal are displayed in display means 205 through control means 203.

The data broadcast signal decoded by the data broadcast signal decoding means 202 is also processed by the control means 203 to be stored temporarily in memory means 204.

On the other hand, exchange of main information and acquisition of related information with a response server 206 containing a computer system and others connected to a telephone circuit, and having functions of collecting response information from users (viewers) and transmitting the results to the broadcasting station and the like are executed through interface means 207, and the relation of the input and output information of the interface means 207 and data broadcast signal from the data broadcast signal decoding means 202 is controlled by the control means 203.

Moreover, operation input means 208 is provided as operation means from the user, being composed of remote controller or the like, and it controls the control means 203 through the interface means 207.

A specific operation is described below. In the case data broadcast signal such as teletext signal is superposed on the television signal received in the video signal receiving means 201, the information is decoded in the data broadcast signal decoding means 202. In this information, aside from the main information such as text and graphic information, auxiliary information for enabling display control of main information and two-way information exchange (interactive teletext program) using the response server 206 is superposed in synchronism with the main information.

In relation to the response server 206, the main information (server program) is obtained through the interface means 207, and related auxiliary information (telephone number, control signal, etc.) is obtained as required.

When only the teletext is desired to be viewed, the text information decoded by the data broadcast signal decoding means or the text information already taken in the memory means 204 is selected and controlled by the control means 203 according to the user's request through the operation input means 208, and is displayed in the display means 205.

According to the content of the displayed text information, if desired to report the result selected therefrom for shopping to the response server 206 or desired to fetch other related information from the response server 206, first auxiliary information aside from the main information contained in the data broadcast signal, and second auxiliary information for two-way information exchange from external device such as response server 206 are acquired, and the control means 203 processes the main information more efficiently according to the operation information or instruction information therein. The control means 203 executes processing by displaying the more efficient operating procedure in the display means 205 from the first and second auxiliary information, and establishing exchange with the response server 206.

As a result, the first and second main information can be processed more efficiently by combining the first auxiliary information superposed on the television broadcast signal and second auxiliary signal from server or the like in other transmission line such as telephone circuit.

This embodiment, meanwhile, relates to television broadcast superposing data broadcast signal such as teletext signal in the vertical blanking period of television broadcasting signal, and hence deals with signal processing, but when data broadcast signal such as teletext signal is superposed on digital television broadcast signal, the television broadcast signal itself is compressed and is transmitted in digital bit stream form. Accordingly, the main information of teletext signal is disposed in the data portion of bit stream, and the auxiliary information is disposed in the header portion of bit stream, and the auxiliary information is acquired by detecting the content of the header portion, so that the header portion may be processed efficiently on the basis thereof.

Embodiment 2

Figure 3:
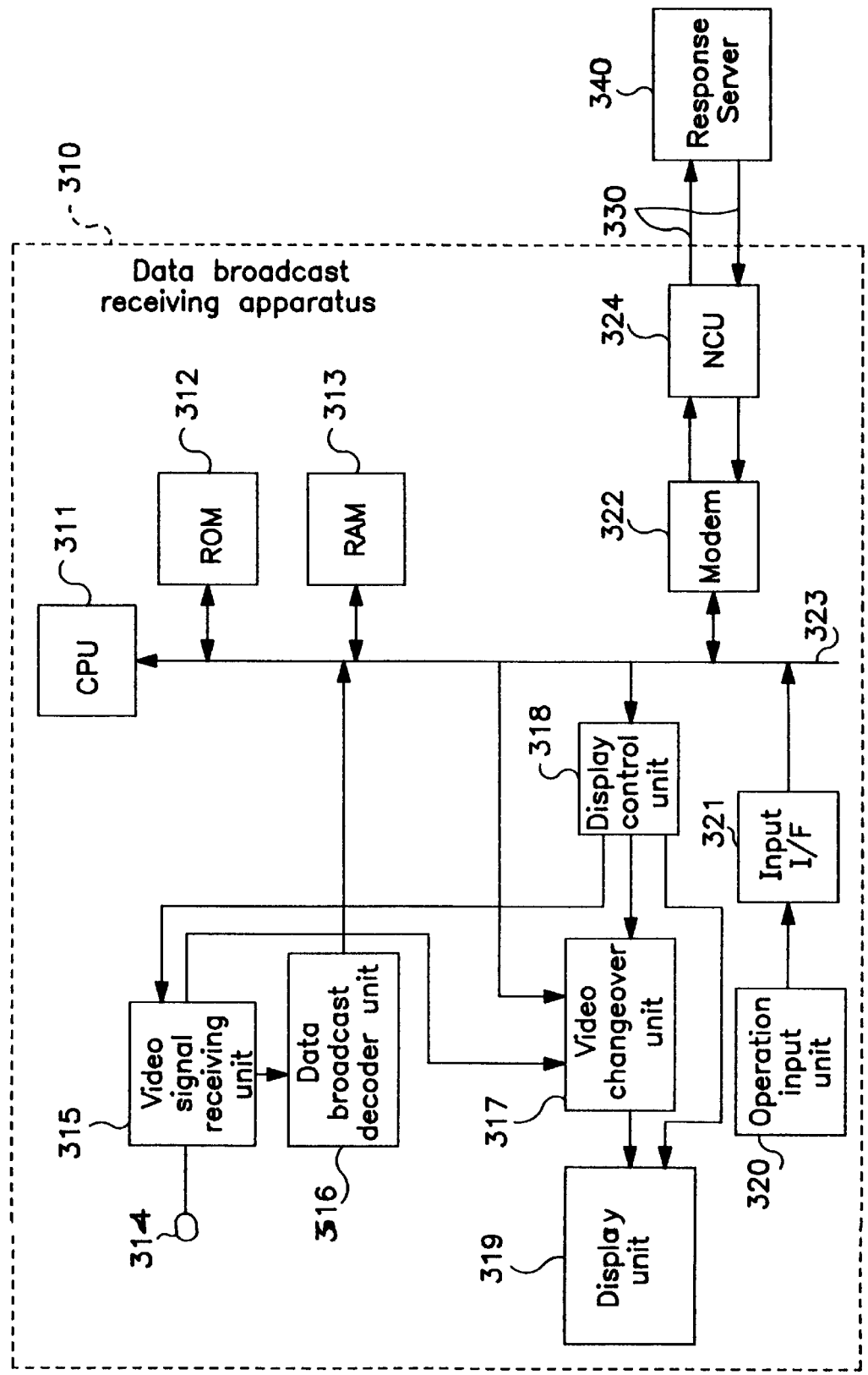
FIG. 3 is a block diagram of a data broadcast receiving apparatus according to a second embodiment of the invention.

FIG. 3 is a block diagram showing an electric configuration of a data broadcast receiving apparatus of a second embodiment of the invention.

In FIG. 3, a data broadcast receiving apparatus 310 is composed as follows. Reference numeral 311 is a central processing unit (CPU) responsible for control of the entire system, 312 is a read-only memory (ROM) for storing programs for its control, 313 is a random access memory (RAM) for assisting control and operation and storing decoded data broadcast signal, 314 is an input terminal of television signal received by a reception antenna (not shown), 315 is a video signal receiving unit for selecting and demodulating a video signal of desired channel from input television signals, 316 is a data broadcast decoder unit for separating and decoding data broadcast signal superposed in the vertical blanking period of demodulated video signal, 317 is a video changeover unit for changing over and sending out the video signal from the video signal receiving unit 315 and data broadcast signal from the RAM 313, 318 is a display control unit for changing over the reception channels in a channel selecting unit in the video signal receiving unit 315, dividing the screen in the display unit 319, scrolling the data broadcast signal, controlling other display state, and controlling the video changeover unit 317, 319 is a display unit of CRT, LCD, or the like, 320 is an operation input unit such as operation panel and remote controller allowing to enter data, 321 is an input interface, 322 is a modem for two-way communication with telephone circuit by converting digital data into analog voice signal level, 323 is a bus for connecting parts including CPU 311, ROM 312, and modem 322, and 324 is a network control unit (NCU) for connecting the modem 322 to a telephone circuit 330. Reference numeral 340 is a response server connected interactively (two-way) with the NCU 324 of the data broadcast receiving apparatus 310 through the telephone circuit 330.

General operation of reception of data broadcast program is described in the first place. The video signal receiving unit 315 selects channel according to the received television signal, and sends out the television signal of the reception channel to the video changeover unit 317, and also sends out to the data broadcast decoder unit 316. In the data broadcast decoder unit 316, the data broadcast signal superposed in the vertical blanking period of the selected video signal is separated and decoded, and is sent out into the RAM 313 to be stored temporarily.

The display control unit 318 controls the video changeover unit 317, sends out either the video signal of television broadcast from the video signal receiving unit 315 or the data broadcast signal being read out from the RAM 313, to the display unit 319.

The display control unit 318 also controls the display form in the display unit 319, whether full screen display or two-screen display, and displays the text data in the lower side or upper side of the full screen by scrolling like superimposing. The control effected by the display control unit 318 is determined by the input command from the operation input unit 320.

When the program of data broadcast is quiz program, variety program, or opinion survey inviting participation of viewers, the user operates to pick up one out of preset answers, and issues an automatic dialing command, then the CPU 311 dials automatically the response server 340 through the modem 322, NCU 324, and telephone circuit 330, and presents the answer information to the response server 340. The response server 340, if necessary, processes the information, and transmits the result to the broadcast station through the telephone circuit.

Next is explained the operation of receiving presentation of online service with the response server 340 by connecting the data transmission receiving apparatus 310 to the response server 340 through the telephone circuit 330.

In this operation, it is assumed to assign online service in an empty channel. The user, wishing to utilize online service, selects an arbitrary empty channel (online channel). This operation is done by remote controller, and a signal is fed into the CPU 311 from the operation input unit 320 through the input interface 321. The channel number of online channel (empty channel) and the telephone number of the response server 340 of the partner side from which the online service is received are preliminarily registered in the RAM 313 by corresponding to each other.

Figure 4:
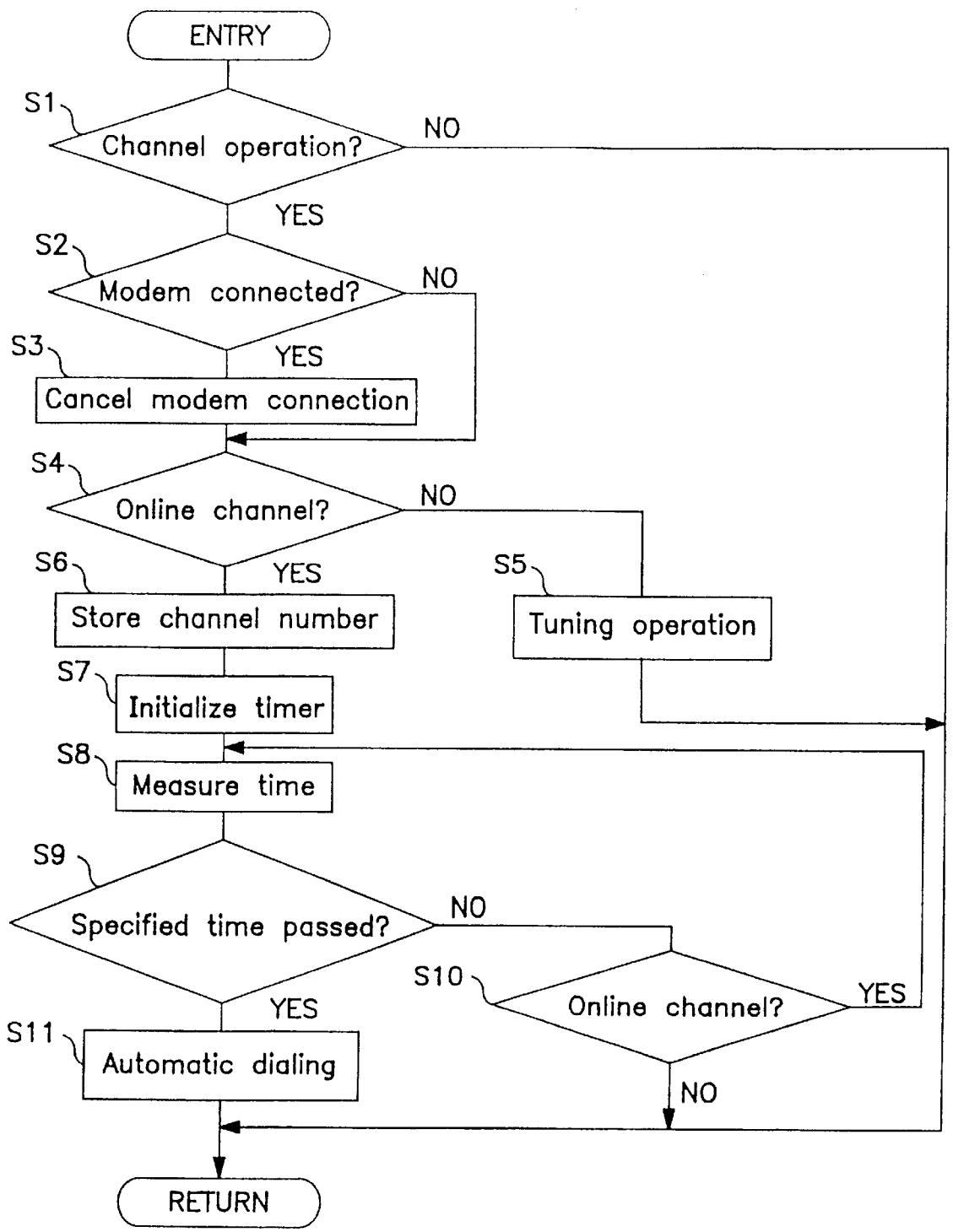
FIG. 4 is a flowchart presented for explanation of operation of the data broadcast receiving apparatus of the second embodiment of the invention.

As shown in the flow chart in FIG. 4, the CPU 311 judges if channel operation has been ever made or not (step S1), and if channel operation has been made, it is judged if the modem 322 is being presently connected or not (step S2), and, if connected, the connection of the modem 322 is canceled (step S3).

The connection of the modem is canceled preliminarily because it is necessary to connect the modem in the empty channel. Channel operation is made not only when setting am empty channel, but also when changing over channels in usual operation. it is hence judged if it is made on the empty channel assigned with online service, that is, online channel or not (step S4). If not empty channel but broadcast assigned channel, the display control unit 318 is driven, and the television broadcast of the channel is received by tuning operation in the tuning unit in the video signal receiving unit 315 (step S5). In the case of online channel, the channel number of the empty channel is stored in the RAM 313 (step S6).

The channel operation is done also at the time of channel searching, and if the present channel is an online channel, it may be corresponding in channel search, or the user might have designated an empty channel for use of online service. To distinguish them, it is judged if the online channel is maintained for a specific time.

That is, first the timer is initialized (step S7), the time is measured (step S8). and it is judged if a specific time has passed or not (step S9), it is judged of the online channel is maintained until the specific time has not passed (step S10), the process returns to step S1 in the case of channel search, and if the specific time has passed while the online channel is maintained, the telephone number preliminarily registered according to the online channel (empty channel) is searched and fond according to the channel number from the RAM 313, and this telephone number is dialed automatically through the modem 322 and NCU 324, and the response server 340 is connected online through the telephone circuit 330 (step S11). By this online connection, the online service is enabled, and the information can be acquired or data may be transmitted.

In this way, by assigning an online channel in an empty channel, and designating the empty channel (online channel) by the user, the online service can be utilized easily at a desired time. Or, by setting of a momentary empty channel in channel search, online service is not connected, but online service is connected automatically by intentional channel setting by the user (that is, passing of a specific time).

Thus, according to the data broadcast receiving apparatus, only by designating an empty channel corresponding to online service by the user, the online service can be easily utilized at a desired time. Moreover, ignoring the momentary setting of empty channel in channel search, only when the user intentionally designates an empty channel, the online service is connected, so that the online service may be utilized efficiently.

Besides, instead of assigning online service in an empty channel, by merely storing in the RAM 313, it may be also constituted to control to dial automatically by the CPU 311.

Embodiment 3

A data broadcast receiving apparatus in a third embodiment of the invention is described below while referring to drawings. The electric configuration of the data broadcast receiving apparatus is identical with the constitution in FIG. 3 relating to the second embodiment, and its explanation is omitted, but the difference is described while referring to the flowchart.

First, general operation of reception of the data broadcast program is described. The video signal receiving unit 315 selects channel from the received television signal, sends out the television signal of the reception channel to the video changeover unit 317, and also sends out to the data broadcast decoder unit 316.

In the data broadcast decoder 316, the data broadcast signal superposed in the vertical blanking period of the selected video signal is separated and decoded, and is sent out into the RAM 313 to be stored temporarily.

The display control unit 318 controls the video changeover unit 317, and sends out either the video signal of television broadcast from the video signal receiving unit 315 or the data broadcast signal being read out from the RAM 313 to the display unit 319. The display control unit 318 controls the display form in the display unit 319, whether full screen display or two-screen display, and displays the text data in the lower side or upper side of the full screen by scrolling like superimposing. The control effected by the display control unit 318 is determined by the input command from the operation input unit 320.

When the program of data broadcast is quiz program, variety program, or opinion survey inviting participation of viewers, the user operates to pick up one out of preset answers, and issues an automatic dialing command, then the CPU 311 dials automatically the response server 340 through the modem 322, NCU 324, and telephone circuit 330, and presents the answer information to the response server 340. The response server 340, if necessary, processes the information, and transmits the result to the broadcast station through the telephone circuit.

Figure 5:
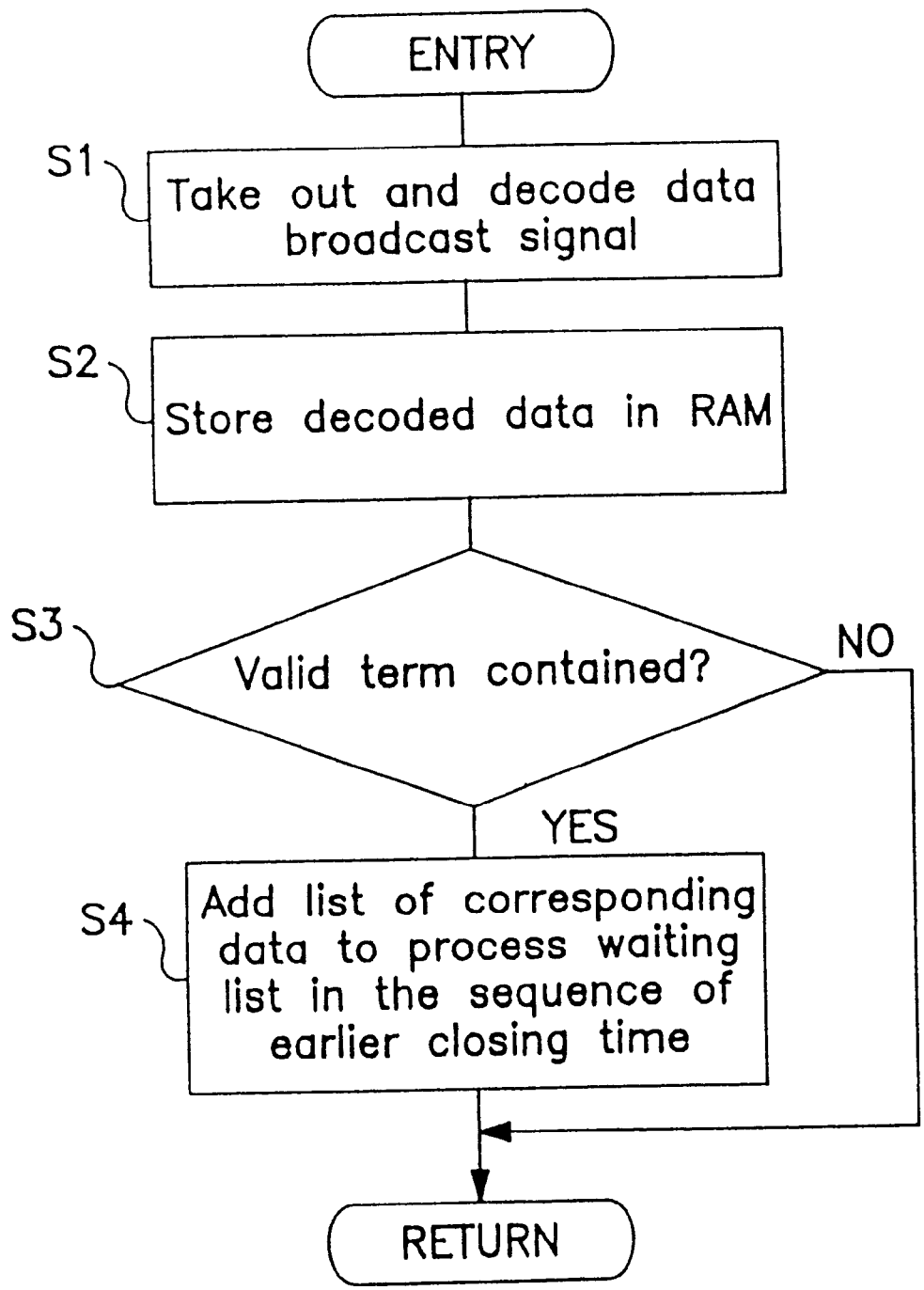
FIG. 5 is a flowchart showing process of adding data with valid term to a process waiting list in a data broadcast receiving apparatus according to a third embodiment of the invention.

Next, the operation in the case of online shopping is described below. FIG. 5 is a flowchart showing the process of adding data with valid term to a process waiting list. In the data broadcast decoder unit 316, data broadcast signal is taken out from video signal, and is decoded (step S1), and decoded data is stored in the RAM 313 (step S2).

The decoded data includes the telephone number of the response server 340, mail-order sales company name, merchandise name, merchandise number, price and others relating to online shopping, and may also include the valid term of data, that is, closing time of order entry. Accordingly, it is judged if valid term is contained or not in the data stored in the RAM 313 (step S3), and if valid term is contained, and a list of such data is added to the process waiting list in the sequence from the earlier closing time (step S4).

Figure 7A:
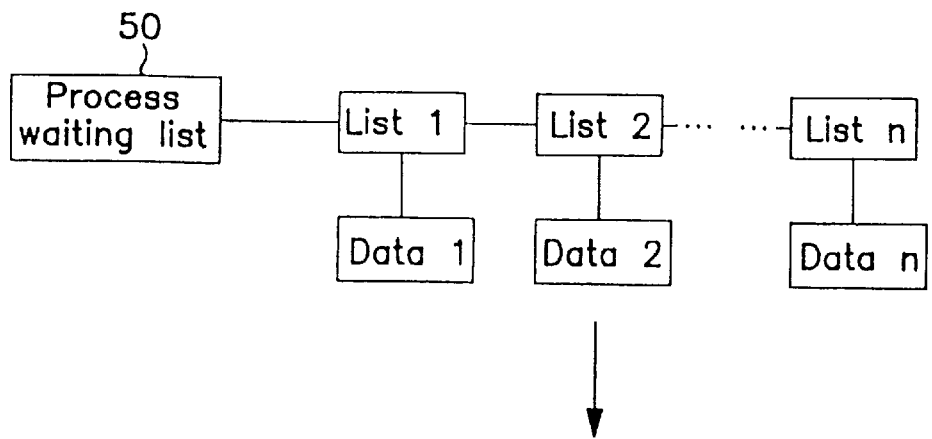
FIG. 7 (*a*) is a schematic diagram showing process of adding data with valid term to the process waiting list in the data broadcast receiving apparatus of the third embodiment of the invention.
Figure 7B:
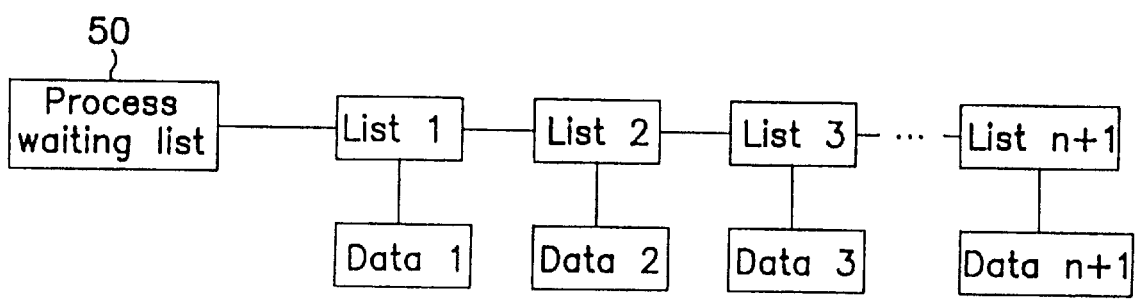

The mode of adding is shown in FIG. 7. In the state in FIG. 7 (a), list 1 (beginning list) of data 1 to list n of data n are registered in a process waiting list 50. Data 1 to data n individually contain the telephone number, mail-order sales company, merchandise name, merchandise number, price, and valid term (closing time). The closing time of data 1 is the earliest, and the closing time of data n is the latest. Suppose there is data with valid term, and its closing time is earliest next to the closing time of data 1, and then, as shown in FIG. 7 (b), the list to be added is list 2, and list 2 before addition becomes list 3, list 3 before addition is list 4, and similarly list n before addition is list n+1, sequentially.

Figure 6:
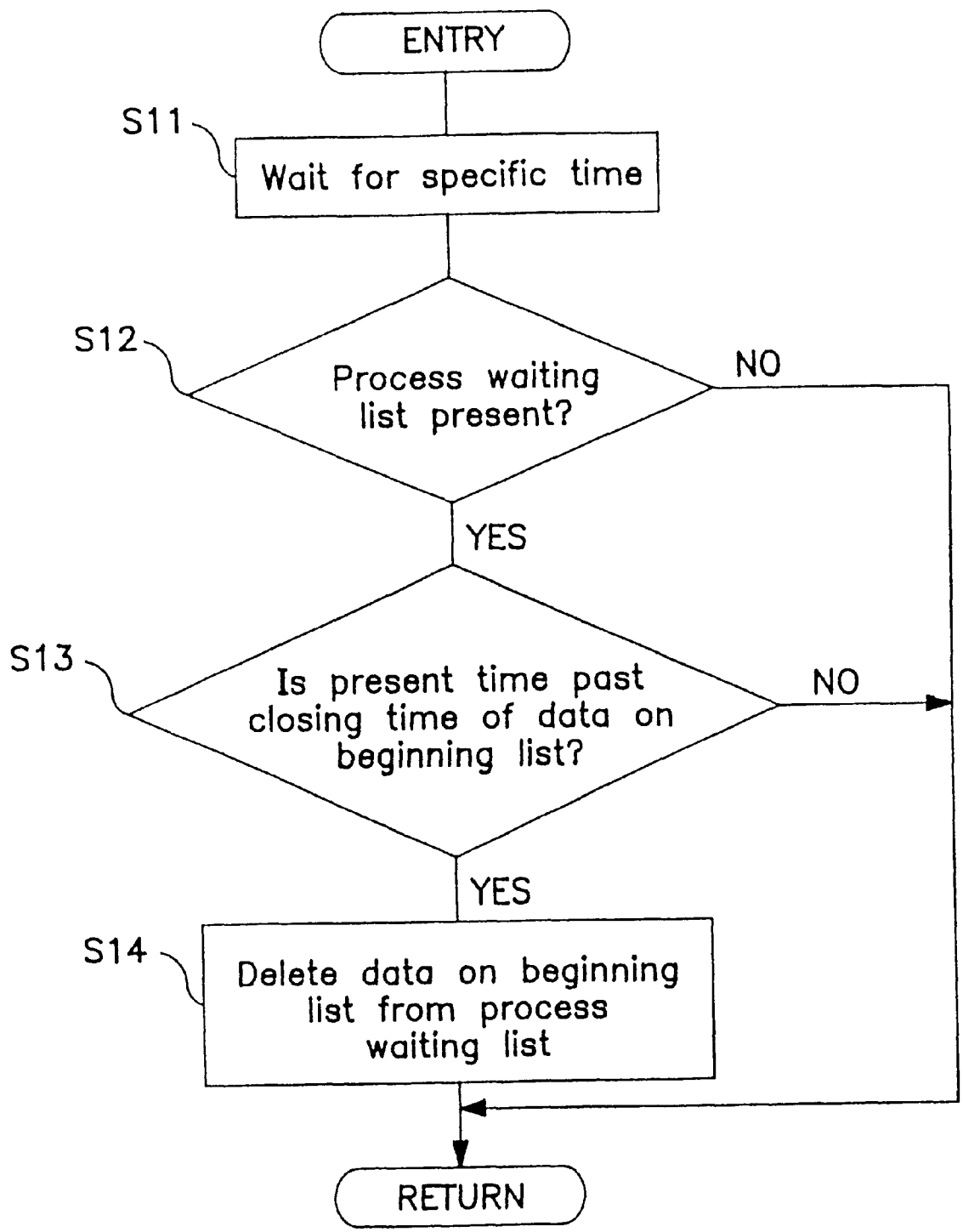
FIG. 6 is a flowchart showing process of deleting a list of expired data from the process waiting list in the data broadcast receiving apparatus of the third embodiment of the invention.

FIG. 6 is a flowchart showing the process of deleting the list of expired data from the process waiting list. The CPU 311 counts the built-in timer, waits for a specific time (step S11), judges if process waiting list is present or not (step S12). and judges, if present, if the present time is past the closing time in data 1 of list 1 (beginning list) (step S13). When the present time is past the closing time, the data 1 of list 1 (beginning list) is deleted (step S14).

Figure 8A:
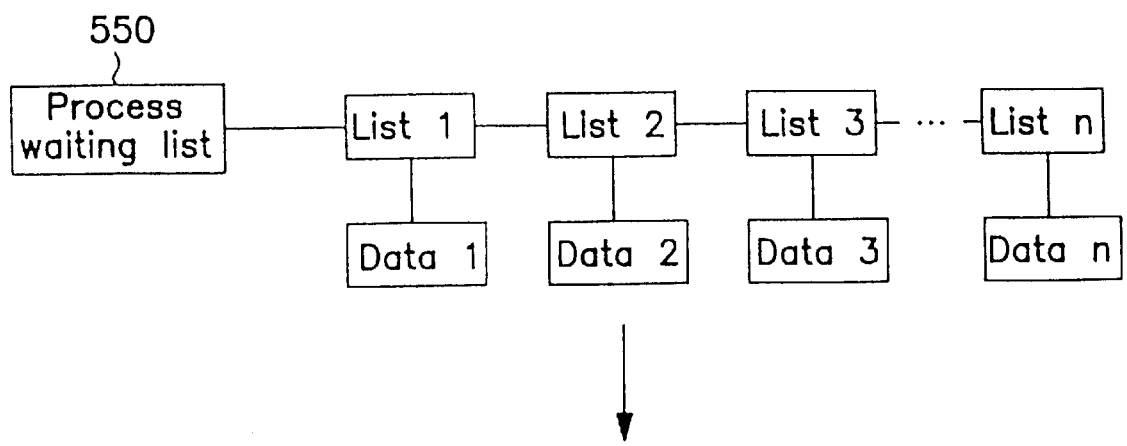
FIG. 8 (*a*) is a schematic diagram process of deleting the list of expired data from the process waiting list in the data broadcast receiving apparatus of the third embodiment of the invention.
Figure 8B:
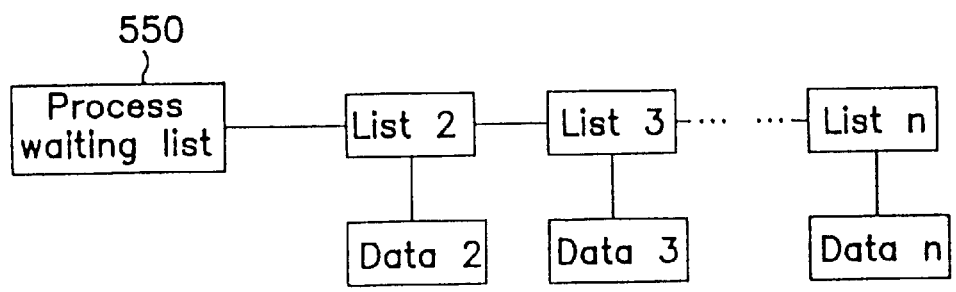

The mode of deleting is shown in FIG. 8. In the state in FIG. 8 (a), list 1 (beginning list) of data 1 to list n of data n are registered in the process waiting list 50. When the present time is past the closing time of data 1, data 1 is eliminated, and list 1 is not present, and hence list 2 to list n of data 2 to data n are left over on the process waiting list 50. As the time passes, the data are deleted sequentially from the earlier closing time, from data 2 to data 3, data 4, and so forth.

As for the data remaining on the process waiting list 50, the user can utilize online shopping whenever desired. When a read command is given from the operation input unit 320 by remote control, the CPU 311 reads out the corresponding data from the RAM 313, and dials automatically to the telephone number of the data through the modem 322 and NCU 324, so that the online service is connected to the response server 340 through the telephone circuit 330. Besides, since the useless data passing the closing time of valid term is deleted, useless connection of online service can be avoided.

Thus, according to the embodiment, the online service data with valid term can be appropriately controlled. Not limited to online shopping, it may be also applied to other online service with valid term, such as opinion survey and viewer participated program.

As for data listed on the process waiting list, the user can utilize on-line service whenever desired, and since the useless data passing the closing time of valid term is deleted, useless connection of online service can be avoided, and therefore the online service with valid term can be controlled appropriately.

In this embodiment, the efficacy of data is discussed from the viewpoint of valid term, that is, the time information, but since the efficacy can be also judged by the past history of handling of the data (if a great number of times of display is stored, the data may be estimated to be considerably old, or if the recorded data is very different from the current information (price or quantity), and it may be judged useless), similar effects are obtained by applied in similar data management.

Embodiment 4

A data broadcast receiving apparatus in a fourth embodiment of the invention is described below while referring to drawings. The electric configuration of the data broadcast receiving apparatus in this embodiment is identical with the constitution in FIG. 3 relating to the second and third embodiments, and its explanation is omitted, but the difference is described while referring to the flowchart.

First is explained the receiving operation of data broadcast program. The video signal receiving unit 315 selects channel from the received television signal, and sends out the television signal of the received channel to the video changeover unit 317 and also sends out to the data broadcast decoder unit 316. In the data, broadcast decoder 316, the data broadcast signal superposed in the vertical blanking period of the selected video signal is separated and decoded, and is sent out into the RAM 313 to be stored temporarily.

The display control unit 318 controls the video changeover unit 317, and sends out either the video signal of television broadcast from the video signal receiving unit 315 or the data broadcast signal being read out from the RAM 313 to the display unit 319. The display control unit 318 controls also the display form in the display unit 319, whether full screen display or two-screen display, and displays the text data in the lower side or upper side of the full screen by scrolling like superimposing. The control effected by the display control unit 318 is determined by the input command from the operation input unit 320.

When the program of data broadcast is quiz program, variety program, or opinion survey inviting participation of viewers, the user operates to pick up one out of preset answers, and issues an automatic dialing command, then the CPU 311 dials automatically the response server 340 through the modem 322. NCU 324, and telephone circuit 330, and presents the answer information to the response server 340. The response server 340, if necessary, processes the information, and transmits the result to the broadcast station through the telephone circuit.

The operation of using the response server 340 is described below.

Beforehand, in the data broadcast receiving apparatus 310, data of desired reception form is entered through the operation input unit 320 through remote control, and is transmitted to the response server 340 through input interface 321, bus 323, modem 322, NCU 324, and telephone circuit 330, and the data is registered in the response server 340. Various data may be registered.

For example, a drama or movie in which a specific actor appears, a music program performed by a specific singer, a news program dealing with a specific case, a sports program of a specific team, news, television shopping program, a special event program, weather forecast of a specific district, stock report of a specific industry, and other television broadcast program and data broadcast program desired individually by the user may be registered. As the number of broadcast channels increases, varied programs and services are presented.

Registration is not limited to television broadcast programs alone. Programs presented from the response server 340 (called server programs) may be also registered. Such examples may include stock report, local weather forecast, and event and shopping information. The data to be registered are not limited to the types of programs alone, but include full screen display or two-screen display in the display unit 319, display in sub-screen, and scroll display in a narrow strip in the bottom or top, among others.

The response server 340 sends out a control signal including necessary commands to the data broadcast receiving apparatus 310 through the telephone circuit 330, immediately before the time of broadcast and presentation of registered television program or server program. The transmitted control signal is put into the CPU 311 from the NCU 324 through the modem 322.

Figure 9:
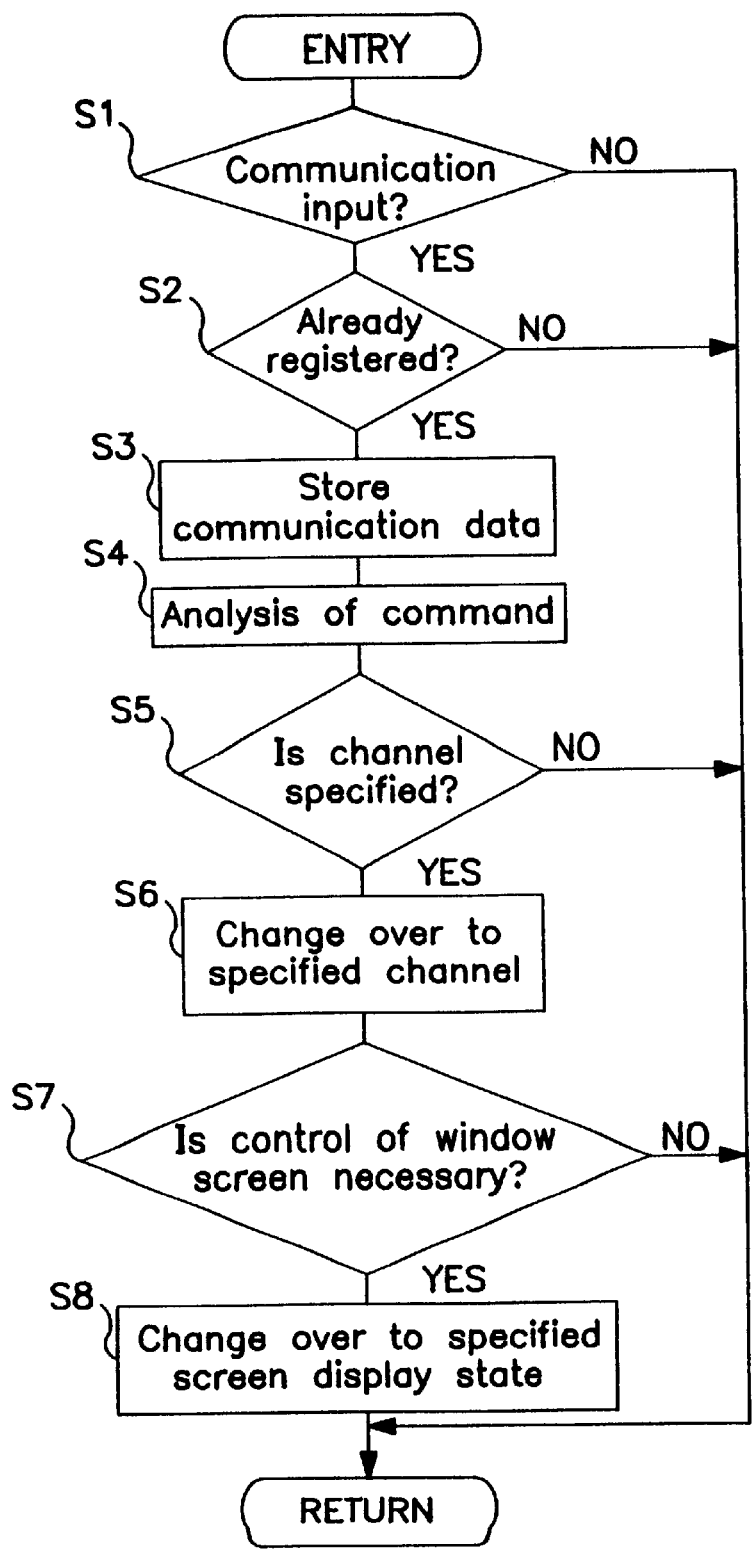
FIG. 9 is a flowchart presented for explanation of operation of a data broadcast receiving apparatus according to a fourth embodiment of the invention.

As shown in the flowchart in FIG. 9, the CPU 311 judges if the input control signal is a communication input from the response server 340 or not (step S1). and if it is a communication input, it is judged if the communication input is from the response server 340 registered preliminarily or not (step S2), and if it is a communication input from the registered response server, the communication data transmitted through the telephone circuit 330, NCU 324, and modem 322 is taken in succession to the control signal, and stored in the RAM 313 (step S3). Consequently, the CPU 311 starts analysis of the command in the data stored in the RAM 313 (step S4).

Types of command are varied, and herein the channel designation and window designation are described. In command analysis, when it is judged that the channel is designated (step S5), the CPU 311 controls the display control unit 318 so as to change over the tuned channel in the video signal receiving unit 315 to the designated (registered) corresponding channel (step S6).

Next, judging if necessary to control the window screen of the display unit 319 (step S7), if necessary, it is changed over to the screen display state designated preliminarily. For example, in two-screen display, the television broadcast program of the tuned channel is displayed in one screen, and the data broadcast program is displayed in the other screen. Or, by displaying the television broadcast program nearly in the full screen, the data broadcast program is shown in the lower or upper strip of the full screen by scrolling like superimposing. Any desired display format is registered by the user in the response server 340 through the telephone circuit 330 by remote control beforehand. Or, after displaying in specified registered format, the user may change the display format by remote control.

In this way, if the television broadcast signals are presented in multiple channels, and the quantity of superposed data increases, the user can choose and select the information, and the type of information needed by the user may be preliminarily registered in the response server, and at specific timing, the response server sends out a control signal to the data broadcast receiving apparatus at the user side, and the data broadcast receiving apparatus automatically sets in the corresponding channel according to the control signal, so that the user can view the desired program at due timing and obtain necessary information. If a desired program is data broadcast, the data sent by data broadcast may be accumulated in the RAM 313.

Incidentally, the data broadcast receiving apparatus of the embodiment can operate in interactive data communication mode with the response server, while not receiving television broadcast. In the data broadcast receiving apparatus 310, the operation input unit 320 is set in registration mode by remote control. The screen display format is also entered. The input data is transferred to the response server 340 through the modem 322, NCU 324, and telephone circuit 330, and is registered in the response server 340. The response server 340 sends out various information and programs moment after moment, and at the timing of sending out the information and program registered from a certain user, a control signal for start of transmission is sent out to the data broadcast receiving apparatus 310 of the user through the telephone circuit 330. The data broadcast receiving apparatus 310 receiving this control signal analyzes the command from the control signal same as above, and displays the information and program sent out from the response server 340 through the telephone circuit 330 in the display unit 319 in a specified display format. This operation format is also to control the screen of the data broadcast receiving apparatus in response to the command sent from outside through the telephone circuit. Accordingly, using the telephone circuit, online shopping, ticket booking, and program guide information can be obtained easily.

Meanwhile, the data broadcast receiving apparatus receiving the control signal sent out from the response server through the telephone circuit by the modem may be also constituted to display the object or content of control of the control signal by the icon on the display unit. In this case, the icon data is incorporated in the ROM of the data broadcast receiving apparatus, and a code for specifying the icon should be contained in the control signal. By clicking the icon, the corresponding action is started. Registration of specified item from the user of the data broadcast receiving apparatus into the response server may be done automatically through the telephone circuit by remote control, or done manually by the operator at the response server side according to the order statement from the user.

In this way, according to the data broadcast receiving apparatus of the embodiment, in the television receiver capable of receiving data broadcast, it is realized to receive presentation of service in a completely new style of control of the display format of the display unit screen by external control through telephone circuit.

As the television broadcast signal is presented in multiple channels and the quantity of superposed data increases, by registering the type of information required by the user preliminarily in the response server, the response server sends out a control signal to the data broadcast receiving apparatus of the user side at specified timing, and the data broadcast receiving apparatus automatically sets in the corresponding channel according to the control signal, so that the user can view the desired program at due timing and obtain necessary information.

Moreover, when the desired program is a data broadcast program, the screen may be divided into two sections, and the desired data broadcast program may be displayed in one of them, or the data may be displayed in the lower or upper strip of a full screen by scrolling like superimposing.

Embodiment 5

A data broadcast receiving apparatus in a fifth embodiment of the invention is described below while referring to drawings. The electric configuration of the data broadcast receiving apparatus in this embodiment is identical with the constitution in FIG. 3 relating to the second, third and fourth embodiments, and its explanation is omitted, but the difference is described while referring to the flowchart.

First is explained a general receiving operation of data broadcast program. The video signal receiving unit 315 selects channel from the received television signal, and sends out the television signal of the received channel to the video changeover unit 317 and also sends out to the data broadcast decoder unit 316. In the data broadcast decoder 316, the data broadcast signal superposed in the vertical blanking period of the selected video signal is separated and decoded, and is sent out into the RAM 313 to be stored temporarily.

The display control unit 318 controls the video changeover unit 317, and sends out either the video signal of television broadcast from the video signal receiving unit 315 or the data broadcast signal being read out from the RAM 313 to the display unit 319. The display control unit 318 controls also the display form in the display unit 319, whether full screen display or two-screen display, and displays the text data in the lover side or upper side of the full screen by scrolling like superimposing. The control effected by the display control unit 318 is determined by the input command from the operation input unit 320.

When the program of data broadcast is quiz program, variety program, or opinion survey inviting participation of viewers, the user operates to pick up one out of preset answers, and issues an automatic dialing command, then the CPU 311 dials automatically the response server 340 through the modem 322, NCU 324, and telephone circuit 330, and presents the answer information to the response server 340. The response server 340, if necessary, processes the information, and transmits the result to the broadcast station through the telephone circuit.

Next, in the case of television shopping by washing the television broadcast or online survey, the operation is as follows. In the individual data broadcast receiving apparatus 310, the ID number is preliminarily provided and registered in the RAM 313. The television broadcasting station contains, in the data broadcast signal superposed in the vertical blanking period of the television broadcast, the delay control data, aside from the telephone number of the response server 340 offering online service, mail-order sales company name, merchandise name, merchandise number, price, and other data.

The delay control data is the delay time from request of connection of online service until actual connection operation, related with a numerical value of a part of the ID number. For example, if the first digit of the ID number is 1, delay time of 1 second corresponds, if 2, delay time of 2 seconds corresponds, if 3, delay time of 3 seconds corresponds, and so forth.

Figure 10:
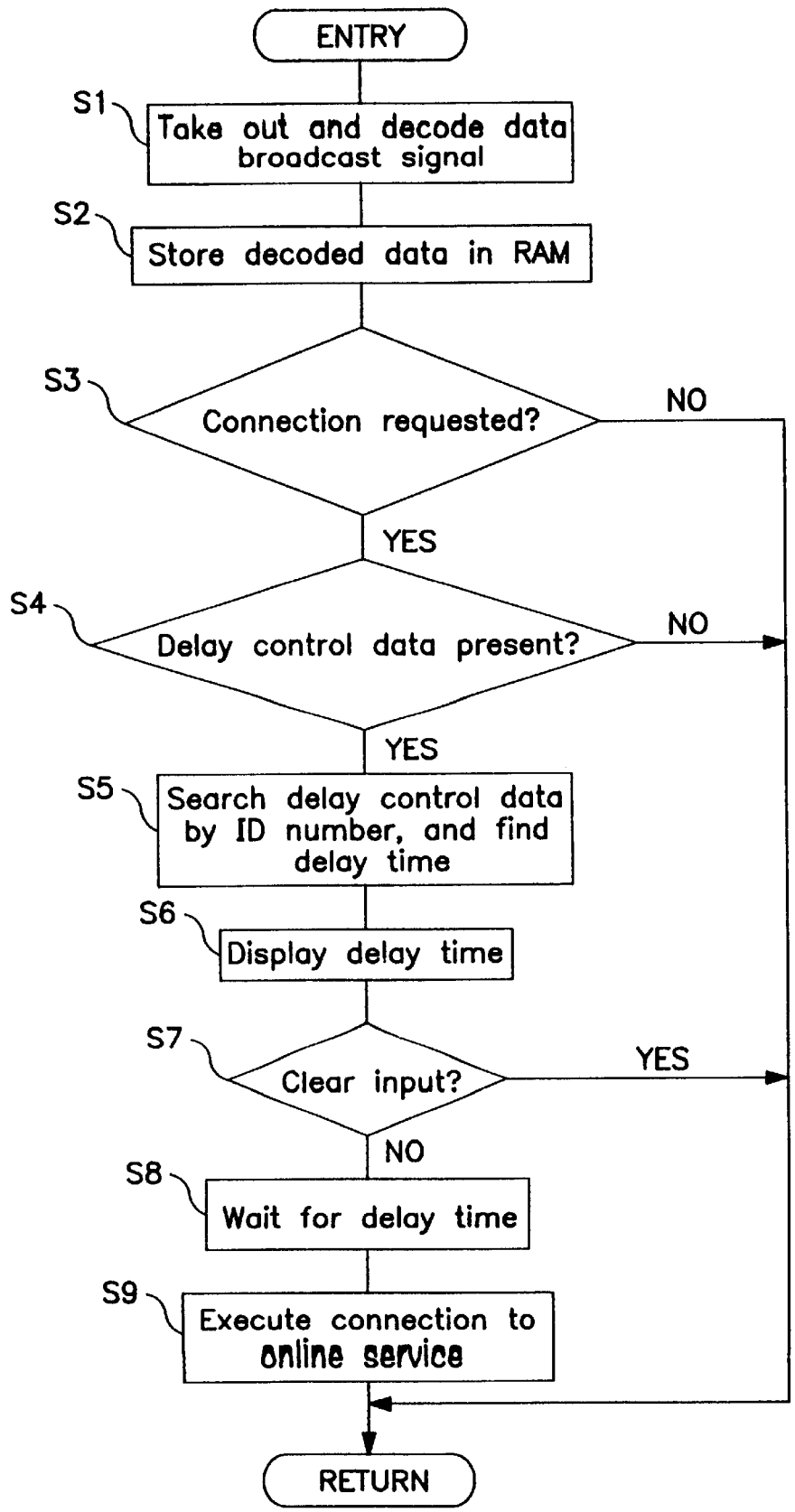
FIG. 10 is a flowchart presented for explanation of operation of a data broadcast receiving apparatus according to a fifth embodiment of the invention.

As shown in the flowchart in FIG. 10, in the data broadcast decoder unit 316, the data broadcast signal is taken out from the video signal and decoded (step S1), and decoded data is stored in the RAM 313 (step S2). The decoded data may contained, as mentioned above, the delay control data, aside from the telephone number of the response server 340 offering online service, mail-order sales company name, merchandise name, merchandise number, price, and other data. The user issues a connection request (dial operation) of online service by remote control, and the CPU 311 judges if the user has operated to request connection or not (step S3). and if connection is requested, it judges if there is control delay data in the data stored in the RAM 313 relating to the connection request (step S4). When the delay control data is present, the delay control data is searched by ID number and delay time is determined (step S5).

By driving the display control unit 318, the delay time is displayed in the display unit 319 (step S6). Judging if clear input is made from the operation input unit 320 (step S7), and waiting for the delay time if not cleared (step S8), and connection to the online service is executed actually after the delay time (step S9). This connection is effected by automatically dialing the telephone number in the data stored in the RAM 313 through the modem 322.

The operation of determining the delay time by searching the delay control data by the ID number is further described below. When television shopping is broadcast, an extremely great number of viewers watching the broadcast in each data broadcast receiving apparatus 310 simultaneously operate to request connection to the online service. If the requests are crowded at the same time, the lines may be extremely busy and cannot be used. However, the data broadcast receiving apparatus 10 with the first digit of ID number being, for example, 5 waits for 5 seconds, the data broadcast receiving apparatus 10 with the first digit of ID number being, for example, 9 waits for 9 seconds, and generally the data broadcast receiving apparatus with the first digit being n waits for n seconds. Therefore, the timing of connection request is dispersed. and disorderly connection tries and busy lines are avoided, and connection tries of each data broadcast receiving apparatus may be smooth on the whole.

Besides, the waiting time (delay time) is displayed and noticed to the user, and the user can wait for passing of the waiting time without being irritated.

Not limited to online shopping, but it may be also applied to opinion surveying, view participation type program, and other online services expected receive heavy connection requests.

In this way, according to the data broadcast receiving apparatus of the embodiment, the timing of connection requests is dispersed among multiple data broadcast receiving apparatuses, and disorderly connection tries and busy lines are avoided, and connection tries of each data broadcast receiving apparatus may be smooth on the whole.

Also, the waiting time (delay time) is displayed and noticed to the user, and the user can wait for passing of the waiting time without being irritated.

Embodiment 6

A data broadcast receiving apparatus in a sixth embodiment of the invention is described below while referring to drawings. The electric configuration of the data broadcast receiving apparatus in this embodiment is identical with the constitution in FIG. 3 relating to the second to fifth embodiments, and its explanation is omitted, but the difference is described while referring to the flowchart.

First is explained a general receiving operation of data broadcast program. The video signal receiving unit 315 selects channel from the received television signal, and sends out the television signal of the received channel to the video changeover unit 317 and also sends out to the data broadcast decoder unit 316. In the data broadcast decoder 316, the data broadcast signal superposed in the vertical blanking period of the selected video signal is separated and decoded, and is sent out into the RAM 313 to be stored temporarily.

The display control unit 318 controls the video changeover unit 317, and sends out either the video signal of television broadcast from the video signal receiving unit 315 or the data broadcast signal being read out from the RAM 313 to the display unit 319. The display control unit 318 controls also the display form in the display unit 319, whether full screen display or two-screen display, and displays the text data in the lower side or upper side of the full screen by scrolling like superimposing. The control effected by the display control unit 318 is determined by the input command from the operation input unit 320.

When the program of data broadcast is quiz program, variety program, or opinion survey inviting participation of viewers, the user operates to pick up one out of preset answers, and issues an automatic dialing command, then the CPU 311 dials automatically the response server 340 through the modem 322, NCU 324, and telephone circuit 330, and presents the answer information to the response server 340. The response server 340, if necessary, processes the information, and transmits the result to the broadcast station through the telephone circuit.

The data broadcast receiving apparatus 310 is connected to the response server 340 through the telephone circuit 330, and the regional individual information is obtained from the response server 340 in the following operation.

Figure 11:
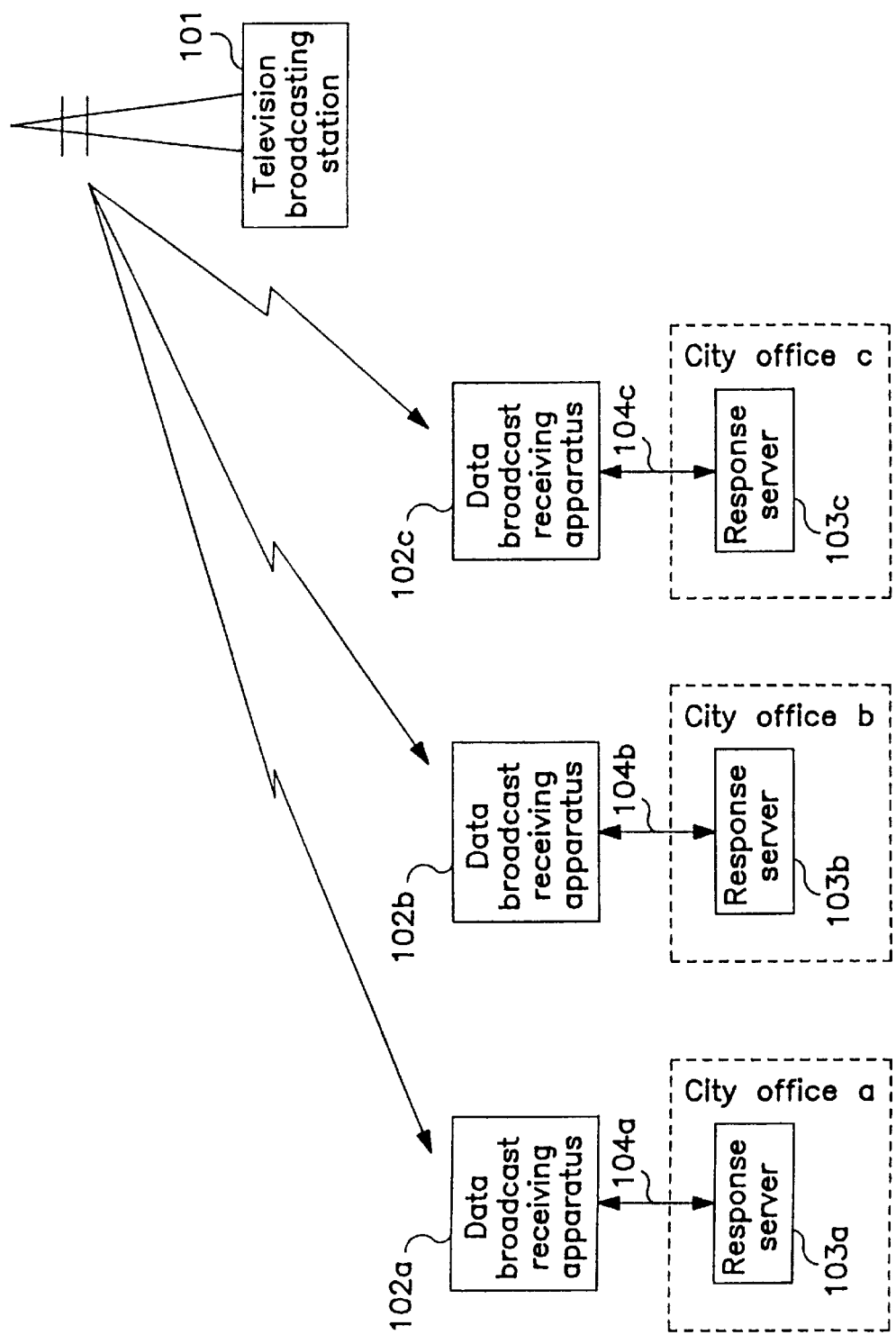
FIG. 11 is a block diagram shoving electric configuration of a data broadcast receiving apparatus according to a sixth embodiment of the invention.

FIG. 11 shows an outline of the system. In FIG. 11, reference numeral 101 is a television broadcasting station, 102a, 102b, 102c, . . . are data broadcast receiving apparatuses installed at individual homes, 103a, 103b, 103c, . . . are response servers locating in the districts of the data broadcast receiving apparatuses 102a, 102b, 102c, . . . , 104a, 104b, 104c, . . . are telephone circuits for interactive (two-way) connection of the data broadcast receiving apparatuses 102a, 102b, 102c, . . . with the response servers 103a, 103b, 103c.

Herein, suppose the response servers 103a, 103b, 103c, are installed at local city offices (or ward offices or branches). Suppose the city office accommodating the response server 103a to be city office a, the city office accommodating the response server 103b to be city office b, and the city office accommodating the response sever 103c to be city office c.

The data broadcast receiving apparatuses 102a, 102b, 102c, . . . are preliminarily identified with ID numbers for designating the local city offices a, b, c (for example, Osaka City, Ibaraki City, Takatsuki City). The television broadcasting station 101 broadcasts by relating the regional ID number with the corresponding regional city office telephone number and information item as the data broadcast signal to be superposed on the television broadcast. The data in such combination of ID number, telephone number and information item is determined in each district, and is broadcast sequentially. The information item includes the local news, guide, event, and weather forecast, and also the code showing presence or absence of emergency, emergency escape destination, etc.

Figure 12:
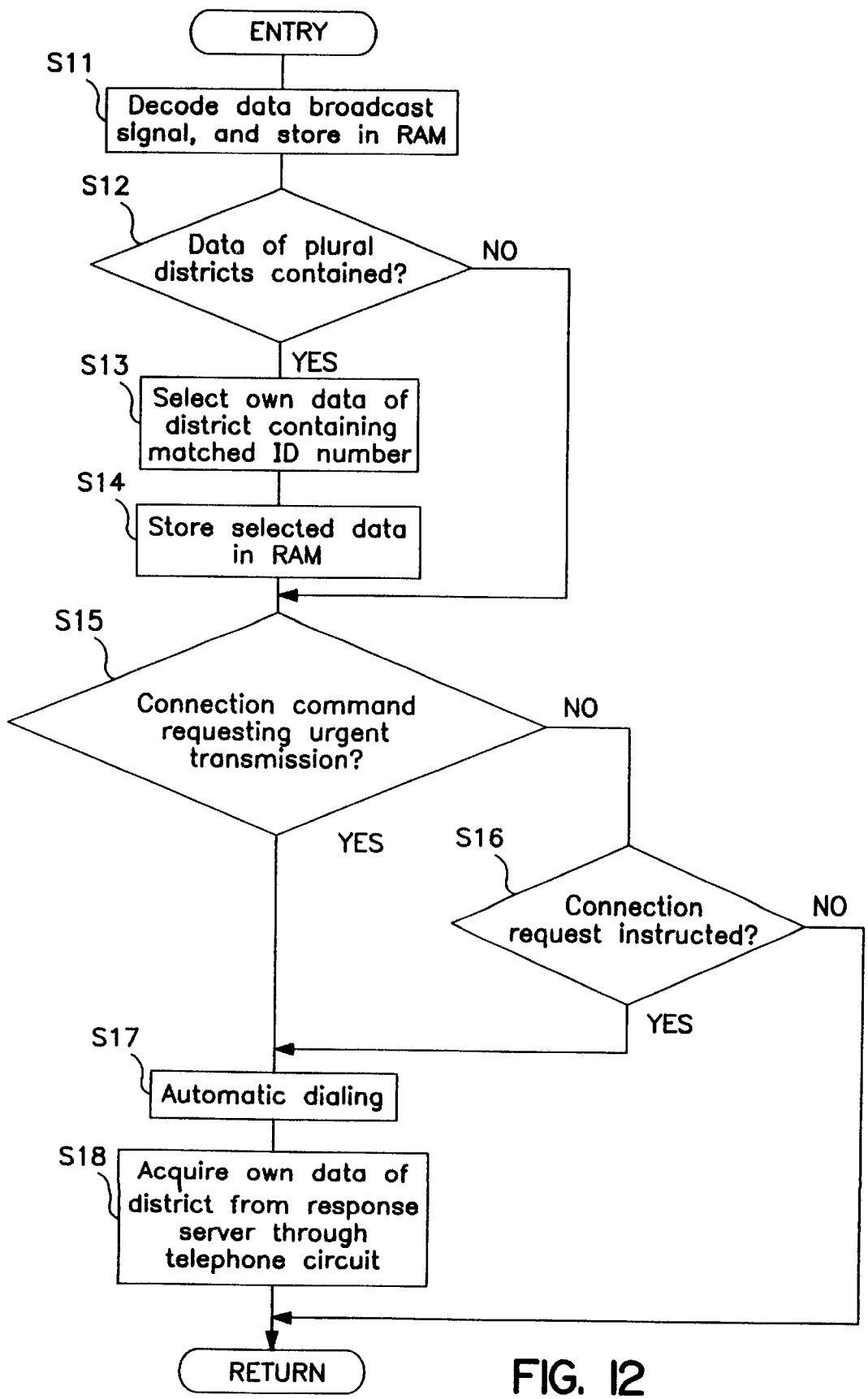
FIG. 12 is a flowchart presented for explanation of operation of the data broadcast receiving apparatus of the sixth embodiment of the invention.

The operation is described below according to the flowchart in FIG. 12. The television signal of the reception channel selected in the video signal receiving unit 315 is sent out to the data broadcast decoder unit 316, and the data broadcast signal is separated and decoded, and the decoded data broadcast signal is stored in the RAM 313 (step S11). Next it is judged if data of plural districts are contained or not in the data stored in the RAM 313 (step S12). It is judged if there are plural ID numbers in the stored data or not.

If data of plural districts are contained, the data of the region of the ID number coinciding with the registered ID number is selected (step S13). The selected data (for example, the telephone number of the city office) is stored in the RAM 313 (step S14).

It is then judged if connection command requesting transmission urgently (emergency code) is contained or not (step S15).

When such connection command is included, the telephone number is read out from the RAM 313, and is automatically dialed through the modem 322 and NCU 324, and two-way connection is made with the response server 340 through telephone circuit 330 (step S17). Specified information is acquired automatically from the response server 340 through the telephone circuit 330 (step S18). For example, when the terminal is the data broadcast receiving apparatus 102*a*, it is connected with the response server 103*a* of city office a through the telephone circuit 104*a* from the modem 322 and NCU 324, and the information of the escape destination of the region is obtained from the response server 103*a*. When the terminal is the data broadcast receiving apparatus 102*b*, it is connected with the response server 103*b* of city office b through the telephone circuit 104*b*, and the information of the escape destination of the region is obtained from the response server 103*b*. The information obtained through the telephone circuit and NCU 324 and modem 322 is stored in the RAM 313, and the CPU 311 controls the display control unit 318 to display in the display unit 319.

If the connection command (emergency code) is not contained, it means a request not requiring urgency. In this case, the information presented from the response server is the local news, guide, event, weather forecast, etc. At this time, the user judges if the connection request is issued from the operation input unit 320 by remote control (step S16). Not always dialing automatically, if not urgent, presence or absence of instruction of connection request by user is judged, so that unnecessary information is not acquired automatically, so that wasteful spending is saved. When the connection is requested by the user, the telephone number is read out from the RAM 313, and is dialed automatically through the modem 322 and NCU 324, and two-way connection is made with the response server 340 through the telephone circuit 330 (step S17). From the response server 340, accordingly, the specified information, that is, the local news, guide, event, weather forecast and other information are acquired automatically through the telephone circuit 330 (step S18). The local information transmitted from the response server may be picture only, but it is preferred to send out both picture and voice in case of emergency.

As a specific example of emergency, suppose an earthquake occurs. In the event of an earthquake, the broadcasting station broadcasts data in the combination of city office ID number telephone number and information item superposed on the television broadcast. The data is decoded in the individual data broadcast receiving apparatuses 102*a*, 102*b*, 102*c*. The data broadcast receiving apparatus 102*a* belonging to city office a stores the telephone number of city office a. The data broadcast receiving apparatus 102*b* belonging to city office b stores the telephone number of city office b. The data broadcast receiving apparatus 102*c* belonging to city office c stores the telephone number of city office c. The data broadcast receiving apparatus 102*a* automatically dials the response server 103*a* of city office a, and automatically acquires the information of escape destination and escape route of the district from the response server 103*a* through the telephone circuit 104*a*.

Similarly, the data broadcast receiving apparatus 102*b* automatically dials the response server 103*b* of city office b, and automatically acquires the information of escape destination and escape route of the district from the response server 103*b* through the telephone circuit 104*b*. The data broadcast receiving apparatus 102*c* automatically dials the response server 103*c* of city office c, and automatically acquires the information of escape destination and escape route of the district from the response server 103*c* through the telephone circuit 104*c*.

The emergency notice information includes, aside from the escape destination and escape route, the time and place of service of water supply car, and time of food distribution. The information not requiring emergency includes the office hours of public institutes, newly purchased books in city library, and many others.

As the operation example, other example may be considered. That is, in case of emergency, if the power source of the data broadcast receiving apparatus is turned off, it is turned on by force, and the emergency information is transmitted securely.

Thus, according to the data broadcast receiving apparatus of the embodiment, various local data and individual data (information specific to age or sex, personal hobby or special information, brand preference information, etc.) are broadcast, and when the local data and individual data of the district of the specific data broadcast receiving apparatus are broadcast, the individual information may be acquired easily by automatically dialing the response server presenting the more specific regional information about the data, or the response server presenting more specific information about the one's own purpose.

In case of emergency, the response server is automatically dialed, and the local information can be acquired automatically.

If not urgent, the individual information is acquired only when the user wishes to acquire, and useless information is not obtained, and wasteful spending is saved.

What is claimed is:

1. A data broadcast receiving apparatus for receiving a television broadcast signal with a data broadcast signal superposed thereon wherein said data broadcast receiving apparatus is for use with a response server comprising:

a data broadcast decoder unit for extracting the data broadcast signal, a display unit for displaying at least one of the television broadcast signal or data broadcast signal, a modem connected to a telephone circuit for receiving information from an online service, and a control unit for storing at least a respective telephone number of the online service from the data broadcast decoder unit, and dialing the telephone number through the modem to connect the online service with the response server when a user selects the telephone number in response to the online service information received through the modem.

2. A data broadcast receiving apparatus for receiving a television broadcast signal with a data broadcast signal superposed thereon wherein said data broadcast receiving apparatus is for use with a response server comprising:

a data broadcast decoder unit for extracting the data broadcast signal, a display unit for displaying at least one of the television broadcast signal and the data broadcast signal, and a modem connected to a telephone circuit, wherein a telephone number of a respective online service is preliminarily stored in a respective empty channel, and the telephone number is dialed through the modem when a user specifies the empty channel corresponding to the respective online service, thereby connecting the online service with the response server.

3. A data broadcast receiving apparatus of claim 2, wherein dialing is effected when the respective empty channel corresponding to the respective online service is accessed for a specific duration.

* * * * *

UNITED STATES PATENT AND TRADEMARK OFFICE
CERTIFICATE OF CORRECTION

PATENT NO.    : 6,028,644
DATED         : February 22, 2000
INVENTOR(S)   : Maeda et al.

It is certified that error appears in the above-identified patent and that said Letters Patent is hereby corrected as shown below:

<u>Title page,</u>
Item [75], Inventors, "Takjo Maeda" should read -- Takio Maeda --.

Signed and Sealed this

Eleventh Day of June, 2002

Attest:

JAMES E. ROGAN
*Attesting Officer*  *Director of the United States Patent and Trademark Office*